Dec. 28, 1954     W. E. PRITCHETT     2,698,039
SEED SCOURER AND SEPARATOR
Filed March 21, 1951     2 Sheets-Sheet 2
FIG·4
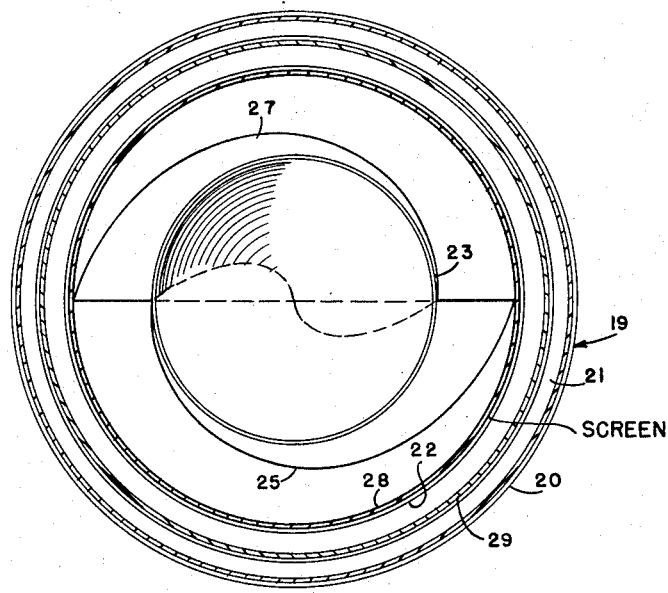
FIG·5
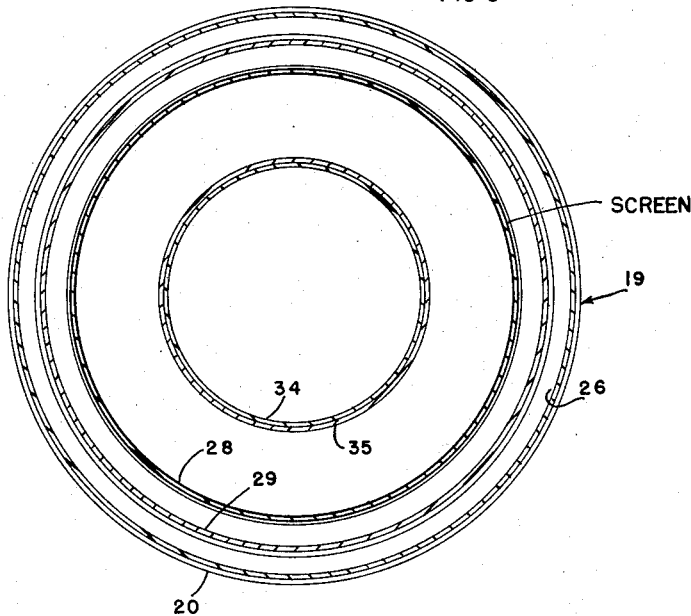
INVENTOR.
WESLEY E. PRITCHETT
BY
ATTORNEY United States Patent Office 2,698,039
Patented Dec. 28, 1954

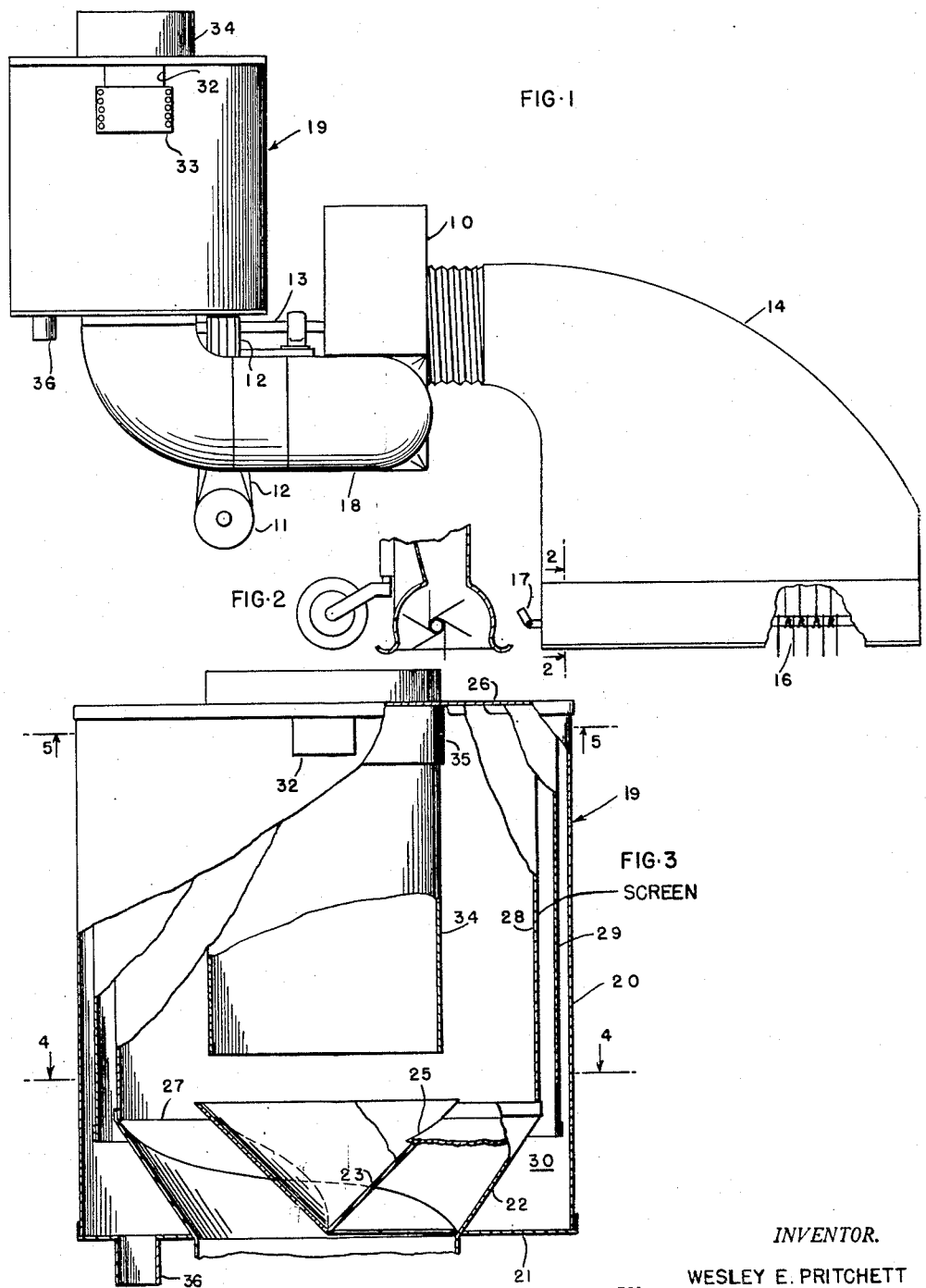

2,698,039

SEED SCOURER AND SEPARATOR

Wesley E. Pritchett, Fort Wayne, Ind.

Application March 21, 1951, Serial No. 216,793

5 Claims. (Cl. 146—258)

This invention relates generally to harvesting machines and more particularly to seed harvesting machines.

According to conventional methods grass seeds and grains are harvested by means of harvesting machinery which includes apparatus for cutting and removing the heads of the plants, and conveying them to a threshing apparatus where mechanical beating action separates the seed or grain from the pod or hull. This type of machinery is extremely complex and expensive to manufacture, as well as being subject to many mechanical failures and high maintenance cost.

Conventional methods and apparatus for harvesting cause appreciable crop losses by reason of this fact, that they permit only one harvesting operation. The heads or clusters of seeds are cut from the stalk, and, as a consequence, only a fractional percentage of the seed in the heads are ripe, and another fractional percentage of the seeds are not ripe. Moreover, another fractional percentage of the seeds may have ripened and fallen from the heads or clusters. Accordingly, the actual and useful harvest consists of a small percentage of the possible crop. A further loss occurs because seeds become separated and lost from the heads during the cutting process and transfer to the threshing apparatus.

Accordingly, the principal object of this invention is to provide a novel seed separating or harvesting machine of simple construction.

Another object of this invention is to provide a seed separating apparatus which will permit a plurality of successive harvesting operations on a single crop.

Still another object of this invention is to provide a seed harvesting or separating mechanism having the ability to harvest, without substantial loss, seeds that shatter easily, or drop easily from the pods or hulls during the harvesting operation.

Still another object of this invention is to provide a seed harvesting or separating mechanism which will harvest and clean grass seeds and grains in a simultaneous operation.

A further object of this invention is to provide a seed separator which may be used not only for field harvesting but also for separating and cleaning seeds which have already been harvested by other types of harvesting machines.

A still further object of this invention is to provide seed harvesting or separating mechanism that will permit reclamation of fallen seeds.

Still another object of this invention is to provide a seed separating mechanism which is adjustable for use with a large variety of seeds and grains.

A further object of this invention is to provide a seed harvesting apparatus for removing seeds from standing grasses or grains without in any way cutting, windrowing, cocking or gathering such grasses or grains.

Another object of this invention is to provide a seed harvesting apparatus which leaves all humus material uniformly distributed on the surface of the soil.

In accordance with this invention there is provided a seed separator comprising a casing, a means for feeding air into said casing and imparting a spiral motion thereto, a means for scouring hulls from seeds borne by said air, and a means for exhausing air from the interior of said casing.

For a better understanding of the invention, together with other and further objects thereof, reference is made to the following description, taken in connection with the accompanying drawings, and its scope will be pointed out in the appended claims.

In the accompanying drawings:

Figure 1 of the drawings is a side view of a harvester and seed separator with parts broken away to illustrate normally hidden apparatus.

Figure 2 is a partial end sectional view on line 2—2 of the lower portion of Figure 1.

Figure 3 is an enlarged partial cross sectional view of the seed separator shown in Figure 1.

Figure 4 is a cross section taken on line 4—4 of Figure 3.

Figure 5 is a cross section taken on line 5—5 of Figure 3.

Figure 1 of the drawings illustrates a harvesting machine incorporating the seed separator provided in accordance with this invention. This machine comprises a conventional blower 10, having a fan (not shown) operated by a power take-off mechanism 11 which may be a conventional tractor power take-off. The fan of blower 10 may be driven through belt 12 and shaft 13. Blower 10 is adapted to create suction in a hood 14, which is adapted to be moved along the ground at a height suitable to remove the seeds, or the heads, or pods of the grass or grain which is being harvested. For beating the heads of such grass or grain which is being harvested there is provided a conventional beater 16, which may be rotated by means of a shaft 17, connected to any suitable driving means such as a separate gasoline engine or the power take-off 11. Blower 10 and hood 14 also cooperate to pick up fallen seeds which may have ripened and fallen before the normal harvesting period. Air, bearing harvested seeds and debris or other material, is circulated through the duct 18 into the seed separating mechanism generally indicated at 19 which is provided in accordance with this invention.

Figures 3, 4 and 5 of the drawings illustrate the seed separator shown in Figure 1. This seed separator consists of a cylindrical drum or casing 20. At the lower end 21 thereof there is provided a spiral air intake conduit comprising an inverted frusto-conical member 22 which is concentrically mounted in the end of drum 20 and connected with duct 18. Within the frusto-conical member 22 there is provided an inverted cone 23, also concentrically mounted with respect to the casing 20. In the space between the frusto-conical member 22 and conical member 23, there is mounted a spiral baffle 25 which extends from the end 21 of drum 20 one hundred and eighty degrees around the conical members to the upper ends thereof. Another spiral baffle 27 is mounted within the space between the conical members 22 and 23, but displaced one hundred and eighty degrees with respect to baffle 25.

The spiral baffles 25 and 27 serve to impart a whirling and upward motion to the air taken into the casing 20 for reasons which will be explained subsequently.

For separating seeds from the air which is whirling within the casing 20, there is provided a cylindrical screen 28, which, to preserve clarity, has been labeled as such rather than shown as such. Screen 28 is mounted on the upper end 26 of casing 20 and has a mesh of such size that seeds of a particular size may pass through it. The size of the mesh may be selected in accordance with whatever type, weight and size of seeds is being harvested. Screen 28 functions to remove pods or hulls by reason of the fact that the whirling air column provides a scouring action or impacts the seeds against the screen and this occurs repeatedly until the hulls are removed and the seeds passed through the screen.

Between the outer casing 20 and the screen 28 there is provided a baffle 29 joined to and supported on the upper end 26 of the casing 20 and extending to a point below the upper extremity of the frusto-conical member 22. This baffle serves to guide seeds and air, after they have passed through the screen, into a chamber 30, between the frusto-conical member 22 and the exterior walls of the casing 20. At the upper end of the casing 20 there is provided a pair of vents or escape ports 32 with covers 33, which exhaust air from the chamber 30 and remove any dust or smaller debris which may have passed through the screen 28 and into the chamber 30.

For exhausting or conducting air out of the separator there is provided a duct or air outlet conduit 34 which is frictionally and movably mounted in a collar 35 at the upper end 26 of casing 20. The exterior walls of the duct 34 serve in cooperation with the screen 28 to provide a circular movement of air expelled out of the spiral harduit formed by baffles 22, 23, 25, and 27, whereby air follows a circular path within the screen 28 causing seeds to pass through the screen 28.

A seed discharge conduit 36 may be mounted in end 21 to connect with chamber 30 for removing seeds from separator 19.

In operation the harvesting machine shown in Figure 1 is operated in the same manner as conventional harvesters, that is, by drawing or propelling it in swaths around a field which is to be harvested. The machine comprising the blower 10, hood 14, and beater 16, functions to remove ripened seeds from the heads of the standing plants and to pick up fallen seeds from the ground. It is to be understood that during the initial stages of the operation the seeds suspended in the air currents within hood 14, blower 10 and conduit 18 may be encased in their hulls or free of their hulls, or encased in foreign matter, depending upon the degree of maturity, moisture conditions or other ambient and field conditions. Air and suspended seeds and other particles drawn in through the blower enter the seed separator through the spiral air intake consisting of the conical members 22 and 23, and the spiral members 25 and 26, which impart a whirling motion to the air and the suspended particles. Because of the whirling motion the air follows an upward, spiral path between air outlet conduit 34 and screen 28. The motion of the air imparts centrifugal force to the seeds and causes the seeds repeatedly to impact the screen until hulls or other attached matter are separated, or scoured, from the seeds, and the seeds pass through the screen. By reason of the particular pitch of the spiral members 25, 26 and the height of the screen 28, the air bearing the seeds completes approximately four revolutions before reaching the top of the screen. In making these four revolutions, most of the seeds are scoured free of hulls or other attached material from repeated impact with screen 28, and pass through screen 28. Baffle 29 then causes the air currents to drop them into the chamber 30. After the air has completed its upward flow, it can flow only downwardly along the exterior surface of the exhaust conduit 34. The path of flow is necessarily shortened, whereby the speed of flow of the air is increased. This increased velocity increases the centrifugal force on unhulled seeds, and causes any seeds which may not have passed through the screen in the first cycle to pass back into the outward and upward flowing air stream before they reach the lower end of duct 34, whereby the seeds make a second cycle with respect to the screen. This cycle repeats until all seeds have passed through the screen.

In order to insure that all seeds are passed through the screen, the duct 34 is adjustably mounted in the casing 20 so that duct 34 may be adjusted in accordance with the weight of the particular seeds which are being harvested. For heavier seeds the duct 34 may be adjusted to a relatively high position because the centrifugal force moves heavier seeds back into the upwardly flowing air relatively quickly, while for lighter seeds the duct 34 may be adjusted to a lower position because the lighted seeds do not respond to the centrifugal force as quickly as the heavier seeds. Hence they tend to travel farther in a downward direction. Thus, duct 34 may be adjusted to a position low enough that no unhulled seeds pass through it.

As already stated, seeds, after being hulled, pass through the screen 28 along with dust and other lighter debris which is of the order of the weight of the seeds themselves. After passing through the screen 28, the seeds and debris are caused to flow downwardly by baffle 29 into the chamber 30. Within the chamber 30 the seeds fall to the bottom of the casing, and the air carrying the dust and other debris travels upwardly between baffle 29 and the outer wall of the casing 20, and is exhausted through ports 32. The seeds do not escape through these ports because the covers 33 may be adjusted to control the flow of air into and out of chamber 30 at such a rate that it will not carry the seeds upwardly between the walls of the baffle 29 and the casing 20. By controlling covers 33 to permit a minimum flow of air which is adequate only to carry dust and debris, which are lighter than the seeds themselves, no seeds pass out of the exhaust ports 32.

From the foregoing description, it is apparent that the seed separator provided in accordance with this invention is capable of harvesting seeds which shatter easily, and to reclaim seeds that have already fallen prior to the harvesting operation. Plants are not damaged by the harvesting action, and any unripened seed heads are left for subsequent harvesting, whereby multiple harvests may be made. By reason of the fact that the stalks of the seed plants or grains are not cut, there is no problem of distributing humus after the harvesting operation, since it remains in its original position and is evenly distributed for subsequent plowing of the field. The harvesting operation is much simplified in that no mowing, windrowing, turning or gathering is involved. As a result of this, there is no spoilage of seeds in windrows or cocks. Further advantage is that the seeds are cleaned at the same time that they are harvested. Also, great variety of grains and seeds may be harvested by this device by using a screen of the proper size of mesh for a particular grain. Also, the seed separator provided by this invention is not only useful for seed harvesting but also for stationary use for separating and cleaning seeds which have already been harvested.

There is disclosed herein a typical example of a seed separator constructed in accordance with this invention, but it is to be understood that the invention is not limited to the specific features disclosed herein. For example, the drawings show a conical intake duct, but it should be understood that any duct which will impart a spiral or whirling motion to the air within the separator is usable in accordance with the spirit of this invention. It should also be understood that it is not necessary to use a perforate screen for separating seeds from their hulls as it is within the scope of this invention to provide a scouring means, such, for example, as a greater or other device having a roughened surface which is capable of removing hulls as they are conveyed into contact therewith by the air currents within the separator. It should be further understood that this invention can be used for separating a great variety of seeds and grains such, for example, as grass seeds, wheat, barley and oats.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A seed separator comprising a cylindrical drum, a spiral air conduit at one end of said drum extending into the interior thereof, for imparting a circular and outward motion to air expelled from said conduit, a cylindrical screen mounted within said drum in the path of said expelled air and adapted to scour and pass seeds borne by said expelled air, baffle means mounted on said drum outwardly of said screen and extending past the periphery of said spiral air conduit, whereby seeds passing through said screen drop into a chamber formed by said one end of said drum and the outer surface of said spiral air conduit, said baffle means forming a chamber between said drum and said baffle means, escape ports formed in the outer wall of said drum adjacent said other end for exhausting air and dust from said seed chamber and an air-outlet conduit movably mounted in the other end of said drum concentrically thereof and extending into the space within said screen to form a chamber between said screen and said outlet conduit within which said expelled air travels upwardly at one speed in a spiral path and downwardly at greater speed.

2. A seed separator comprising a cylindrical drum, a spiral air conduit at one end of said drum extending into the interior thereof, for imparting a circular and outward motion to air expelled from said conduit, a cylindrical screen mounted on the other end of said drum in the path of said expelled air and adapted to scour and pass seeds borne by said expelled air, means to direct said seed-bearing air toward said screen, a cylindrical baffle mounted on said other end of said drum outwardly of said screen and extending past the periphery of said spiral air conduit whereby seeds passing through said screen drop into a chamber formed by said one end of said drum and the outer surface of said spiral air conduit, said baffle forming a chamber between the inner wall of said drum and the outer wall of said baffle, escape ports formed in the outer wall of said drum adjacent said other end for exhausting air and dust from said seed chamber and an air-outlet conduit movably mounted on said other end of said drum concentrically thereof and extending into the space within said screen to form a chamber between said screen and said outlet conduit within which said expelled air travels upwardly at one speed in a spiral path and downwardly at greater speed.

3. A seed separator comprising a cylindrical drum, an air conduit at one end of said drum comprising an inverted frusto-conical member concentric with said drum and extending into the interior thereof, an inverted cone mounted concentrically of said frusto-conical member to form a conical air passage, a spiral baffle between said frusto-conical member and said cone for imparting a circular and outward motion to air expelled from said conduit, a cylindrical screen mounted on the other end of said drum in the path of said expelled air and extending into contact with the periphery of said frusto-conical member and adapted to scour and pass seeds borne by said expelled air, a cylindrical baffle mounted on said other end of said drum outwardly of said screen and extending past the periphery of said frusto-conical member whereby seeds passing through said screen drop into a chamber formed by said one end of said drum and the outer surface of said frusto-conical member, said baffle forming a chamber between the inner wall of said drum and the outer wall of said baffle, escape ports formed in the outer wall of said drum adjacent said other end for exhausting air and dust from said seed chamber and a cylindrical air-outlet conduit movably mounted on said other end of said drum concentrically thereof and extending into the space within said screen to form a chamber between said screen and said outlet conduit within which said expelled air travels upwardly at one speed in a spiral path and downwardly at greater speed.

4. A seed separator comprising a supporting member, an air conduit mounted on said member and comprising an inverted frusto-conical member, an inverted cone baffle mounted concentrically of said frusto-conical member to form a conical air passage, a spiral baffle between said frusto-conical member and said cone for imparting a circular and outward motion to air expelled from said conduit, a cylindrical screen carried by said supporting member coaxially of the circular path followed by said air and in said path, said screen serving to scour and pass seeds borne by said expelled air, and a cylindrical air-outlet conduit adjustably carried by said supporting member coaxially of said cone baffle and opposite the base portion of the latter, said air-outlet conduit also being coaxially arranged with respect to said screen for providing an annular chamber therebetween within which said expelled air may circulate.

5. A seed separator comprising a cylindrical drum, a spiral air conduit at one end of said drum extending into the interior thereof for imparting a circular and outward motion to air expelled from said conduit, a cylindrical screen mounted on the other end of said drum in the path of said expelled air and adapted to scour and pass seeds borne by said expelled air, means to direct said seed-bearing air toward said screen, a cylindrical baffle mounted on said other end of said drum outwardly of said screen and extending past the periphery of said spiral air conduit whereby seeds passing through said screen are directed toward said one end, said baffle forming a chamber between the inner wall of said drum and the outer wall of said baffle, escape ports formed in the outer wall of said drum for exhausting air and dust from said seed chamber, and an air-outlet conduit mounted to extend into said drum concentrically thereof and extending into the space within said screen to form a chamber between said screen and said outlet conduit within which said expelled air travels in a spiral path.

References Cited in the file of this patent

UNITED STATES PATENTS

| Number | Name | Date |
|---|---|---|
| 414,431 | Morse | Nov. 5, 1889 |
| 429,347 | Haskell | June 3, 1890 |
| 739,908 | Nightengale | Sept. 29, 1903 |
| 791,566 | Meyer | June 6, 1905 |
| 1,214,249 | Williams | Jan. 30, 1917 |
| 1,215,935 | Hickman | Feb. 13, 1917 |
| 1,297,349 | Herr | Mar. 18, 1919 |
| 1,756,254 | Lykken | Apr. 29, 1930 |
| 1,887,817 | Messinger | Nov. 15, 1932 |
| 2,433,178 | Ware | Dec. 23, 1947 |